US012650958B2

(12) United States Patent
Izenson et al.

(10) Patent No.: US 12,650,958 B2
(45) Date of Patent: Jun. 9, 2026

(54) SYSTEM, METHOD, AND COMPUTER PROGRAM PRODUCTS FOR MODELING COMPLEX HIERARCHICAL METADATA WITH MULTI-GENERATIONAL TERMS

(71) Applicant: Visa International Service Association, San Francisco, CA (US)

(72) Inventors: Martin David Izenson, Foster City, CA (US); Timothy Dale Gunther, Fremont, CA (US); Eric W. Song, Hayward, CA (US)

(73) Assignee: Visa International Service Association, San Francisco, CA (US)

( * ) Notice: Subject to any disclaimer, the term of this patent is extended or adjusted under 35 U.S.C. 154(b) by 205 days.

(21) Appl. No.: 18/326,085

(22) Filed: May 31, 2023

(65) Prior Publication Data

US 2023/0385248 A1 Nov. 30, 2023

Related U.S. Application Data

(60) Provisional application No. 63/347,080, filed on May 31, 2022.

(51) Int. Cl.
*G06F 16/21* (2019.01)
*G06F 16/22* (2019.01)
(Continued)

(52) U.S. Cl.
CPC ........ *G06F 16/212* (2019.01); *G06F 16/2246* (2019.01); *G06Q 20/3278* (2013.01); *G06Q 20/367* (2013.01); *G06F 16/213* (2019.01)

(58) Field of Classification Search
CPC .. G06F 16/212; G06F 16/2246; G06F 16/283; G06F 3/0482; G06F 3/04815;
(Continued)

(56) References Cited

U.S. PATENT DOCUMENTS 7,836,078 B2 * 11/2010 Dettinger ............ G06F 21/6218
707/783
8,577,991 B2 * 11/2013 Rehmann .................. G06F 8/10
709/217
(Continued)

FOREIGN PATENT DOCUMENTS

WO 2006026636 A2 3/2006

OTHER PUBLICATIONS

C. Hsu, M. Bouziane, W. Cheung, J. Nogues, L. Rattner and L. Yee, "A metadata system for information modeling and integration," Systems Integration '90. Proceedings of the First International Conference on Systems Integration, Morristown, NJ, USA, 1990, pp. 616-624, doi: 10.1109/ICSI.1990.138727. (Year: 1990).*
(Continued)

Primary Examiner — Ryan D Donlon
Assistant Examiner — Steven R Chism
(74) *Attorney, Agent, or Firm* — The Webb Law Firm

(57) ABSTRACT

A method, system, and computer program product is provided for modeling business terms based on attributes and characteristics of a data source. The method includes determining principal terms representing at least one first attribute of a payment processing system, generating a plurality of complex terms including a principal term and representing at least one second attribute of a payment processing system, generating a logical model of principal terms and complex terms, and comprising relations between multiple generations of complex terms arranged in a hierarchical data structure, linking the logical model by mapping each physical data field of a plurality of physical data fields to at least one of a principal term and a complex term in the logical model as metadata, and automatically generating an interactive data dictionary for the payment processing system
(Continued)

100 based on each physical data field and corresponding attributes for metadata of physical data fields.

20 Claims, 4 Drawing Sheets

(51) Int. Cl.
G06Q 20/32 (2012.01)
G06Q 20/36 (2012.01)

(58) Field of Classification Search
CPC .... G06F 16/258; G06F 16/289; G06F 16/252; G06F 16/284; G06Q 20/3278; G06Q 20/367
See application file for complete search history.

(56) References Cited

U.S. PATENT DOCUMENTS

| | | | | |
|---|---|---|---|---|
| 8,612,468 B2 * | 12/2013 | Schloming | | G06F 16/284 |
| | | | | 707/763 |
| 8,775,330 B2 * | 7/2014 | Dettinger | | G06Q 30/04 |
| | | | | 705/400 |
| 10,846,272 B2 * | 11/2020 | Braud | | G06F 16/252 |
| 2004/0254924 A1 * | 12/2004 | Dettinger | | G06F 16/2452 |
| 2016/0019244 A1 * | 1/2016 | Liu | | G06F 16/212 |
| | | | | 707/695 |
| 2021/0406278 A1 * | 12/2021 | Ossher | | G06F 16/2246 |

OTHER PUBLICATIONS

D. M. Smirnov, ISBN 1402006098, "Model (in Logic)", Jun. 6, 2020, https://encyclopediaofmath.org/wiki/Model_(in_logic) (Year: 2020).*

Wang, Y. (2013). Logical Model. In: Dubitzky, W., Wolkenhauer, O., Cho, KH., Yokota, H. (eds) Encyclopedia of Systems Biology. Springer, New York, NY. https://doi.org/10.1007/978-1-4419-9863-7_366 (Year: 2013).*

M. Azarm, F. Nargesian and L. Peyton, "Managing and mapping data lineage for business intelligence and analytics applications in health care," International Conference on Information Society (i-Society 2011), London, UK, 2011, pp. 120-126, doi: 10.1109/i-Society18435.2011.5978521 (Year: 2011).*

Mansmann et al., "Empowering the OLAP Technology to Support Complex Dimension Hierarchies", International Journal of Data Warehousing & Mining, 2007, vol. 3, No. 4, pp. 31-50.

* cited by examiner

100

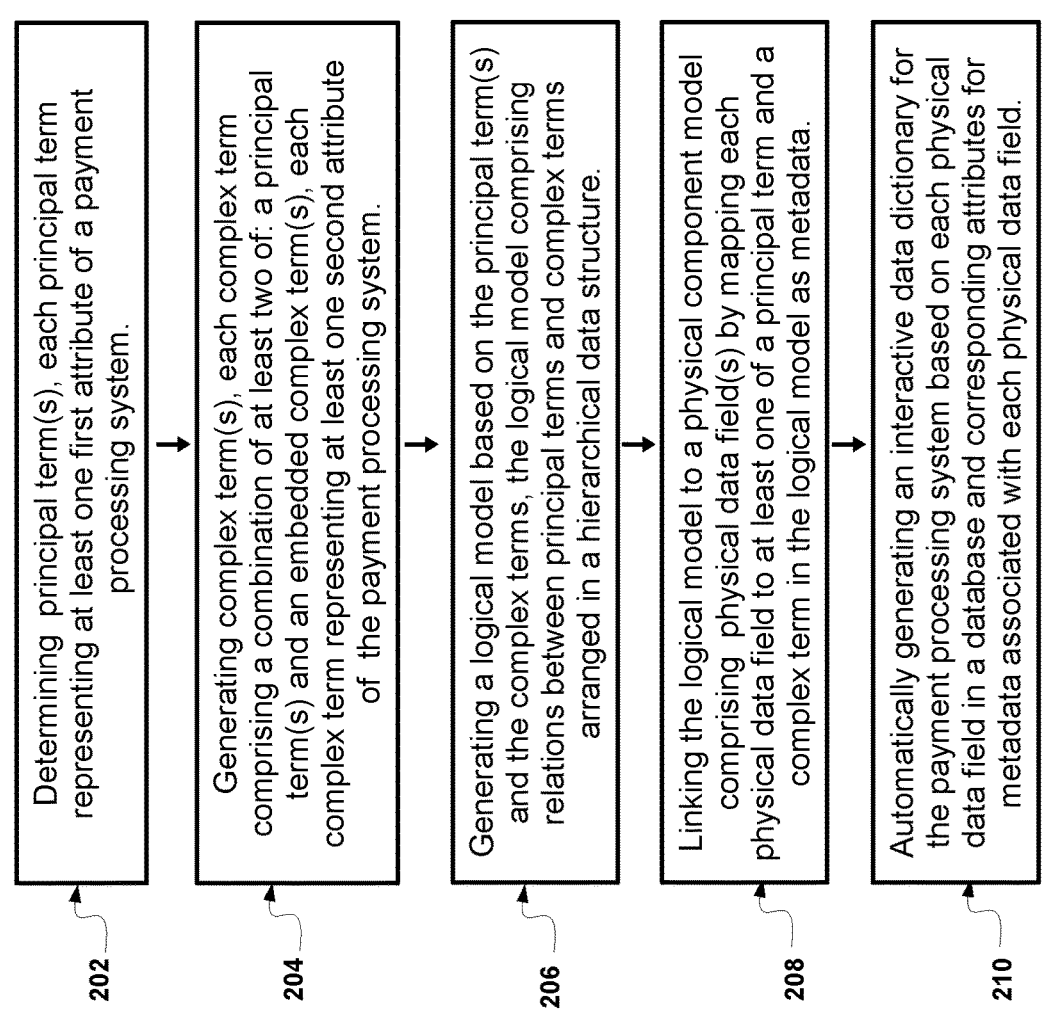

200

202 — Determining principal term(s), each principal term representing at least one first attribute of a payment processing system.

204 — Generating complex term(s), each complex term comprising a combination of at least two of: a principal term(s) and an embedded complex term(s), each complex term representing at least one second attribute of the payment processing system.

206 — Generating a logical model based on the principal term(s) and the complex terms, the logical model comprising relations between principal terms and complex terms arranged in a hierarchical data structure.

208 — Linking the logical model to a physical component model comprising physical data field(s) by mapping each physical data field to at least one of a principal term and a complex term in the logical model as metadata.

210 — Automatically generating an interactive data dictionary for the payment processing system based on each physical data field in a database and corresponding attributes for metadata associated with each physical data field.

SYSTEM, METHOD, AND COMPUTER PROGRAM PRODUCTS FOR MODELING COMPLEX HIERARCHICAL METADATA WITH MULTI-GENERATIONAL TERMS

CROSS REFERENCE TO RELATED APPLICATION

This application claims priority to U.S. Provisional Patent Application No. 63/347,080, filed May 31, 2022, the disclosure of which is hereby incorporated by reference in its entirety.

BACKGROUND

1. Field

This disclosure relates generally to data platforms for creating, retaining, managing, modeling, and/or displaying accurate, complete, timely, and hierarchical complex metadata and in particular to a system, method, and computer program product for modeling complex hierarchical metadata with multi-generational terms.

2. Technical Considerations

Metadata is data that may be used to describe the content in an application (e.g., web page, document, field or file). In some cases, metadata is stored as a set of data in a data repository, such as a database. Metadata provides information about an entity by providing information to aid in the understanding of where the data for a related attribute (e.g., customer ID or a customer name) is coming from or how the data in the attribute is determined. Metadata also provides information about the attributes being used and the impact of changing an aspect of an attribute on other related systems using the attribute.

Systems using metadata may employ tools specifically designed for managing and organizing metadata. The database and its fields may serve as a repository for storing or retrieving information about the data elements within the database. Such systems use techniques to capture or store metadata, including metadata relevant to a particular field in an application, such as a field name, a purpose of the field, a data type, specific constraints associated with the field, validations associated with the field, and/or the like. However, existing systems have not provided solutions for using operational metadata based on complex business terms to provide information about the key attributes of an organization or the entities used.

SUMMARY

Accordingly, the presently disclosed subject matter provides systems, methods, and computer program products for modeling complex hierarchical metadata to more efficiently and accurately store or manage cloud data, cloud warehouse data, integration data, or modeling data that overcomes the deficiencies identified herein.

According to non-limiting embodiments or aspects, provided is a computer-implemented method comprising: determining a plurality of principal terms, each principal term of the plurality of principal terms representing at least one first attribute of a payment processing system; generating a plurality of complex terms, each complex term comprising a combination of at least two of the following: a principal term and an embedded complex term, each complex term representing at least one second attribute of a payment processing system; generating a logical model based on the plurality of principal terms and the plurality of complex terms, the logical model comprising relations between multiple generations of complex terms arranged in a hierarchical data structure; linking the logical model to a physical component model comprising a plurality of physical data fields by mapping each physical data field of the plurality of physical data fields to at least one of a principal term and a complex term in the logical model as metadata; and automatically generating an interactive data dictionary for the payment processing system based on the metadata of the logical model corresponding to each physical data field in a database.

In some non-limiting embodiments or aspects, provided is a computer-implemented method comprising: determining a principal term based on at least one of the following: a physical data field, a physical data table, a physical file, a business term that cannot be further decomposed into component business terms, or any combination thereof.

In some non-limiting embodiments or aspects, generating the logical model comprises identifying one or more entities with a unique role, and one or more attributes associated with each entity of the one or more entities, wherein each attribute defines a characteristic portion of an entity, and wherein each entity comprises a distinct role.

In some non-limiting embodiments or aspects, the one or more entities are combined to form many-to-many relationships between an application and a set of tables, one or more fields, or one or more files.

In some non-limiting embodiments or aspects, provided is a computer-implemented method comprising: displaying a graphical interface comprising a visualization of each respective relationship based on the logical model.

In some non-limiting embodiments or aspects, wherein linking the logical model to a physical component model comprises: determining at least one linked data source for each of the at least one first attribute and the at least one second attribute.

In some non-limiting embodiments or aspects, the at least one linked data source comprises a link to metadata, and determining at least a portion of a data definition based on the link to the metadata.

According to non-limiting embodiments or aspects, provided is a system, comprising: at least one processor configured to: determine a plurality of principal terms, each principal term of the plurality of principal terms representing at least one first attribute of a payment processing system; generate a plurality of complex terms, each complex term comprising a combination of at least two of the following: a principal term and an embedded complex term, each complex term representing at least one second attribute of a payment processing system; generate a logical model based on the plurality of principal terms and the plurality of complex terms, the logical model comprising relations between principal terms and complex terms arranged in a hierarchical data structure; link the logical model to a physical component model comprising a plurality of physical data fields by mapping each physical data field of the plurality of physical data fields to at least one of a principal term and a complex term in the logical model as metadata; and automatically generate an interactive data dictionary for the payment processing system based on the metadata of the logical model corresponding to each physical data field in a database.

In some non-limiting embodiments or aspects, the at least one processor is configured to: determine a principal term based on at least one of the following: a physical data field, a physical data table, a physical file, a business term that cannot be further decomposed into component business terms, or any combination thereof.

In some non-limiting embodiments or aspects, the at least one processor is configured to: identify one or more entities with a unique role, and one or more attributes associated with each entity of the one or more entities, wherein each attribute defines a characteristic portion of an entity, and wherein each entity comprises a distinct role.

In some non-limiting embodiments or aspects, the one or more entities are combined to form many-to-many relationships between an application and a set of tables, one or more fields, or one or more files.

In some non-limiting embodiments or aspects, the at least one processor is configured to: display a graphical interface comprising a visualization of each respective relationship based on the logical model.

In some non-limiting embodiments or aspects, the at least one processor is configured to link the logical model to a physical component model by: determining at least one linked data source for each of the at least one first attribute and the at least one second attribute.

In some non-limiting embodiments or aspects, the at least one linked data source comprises a link to metadata, and the system is configured to: determine at least a portion of a data definition based on the link to the metadata.

According to non-limiting embodiments or aspects, provided is a computer program product comprising at least one non-transitory computer-readable medium including one or more instructions that, when executed by at least one processor, cause at least one processor to: determine a plurality of principal terms, each principal term of the plurality of principal terms representing at least one first attribute of a payment processing system; generate a plurality of complex terms, each complex term comprising a combination of at least two of the following: a principal term and an embedded complex term, each complex term representing at least one second attribute of a payment processing system; generate a logical model based on the plurality of principal terms and the plurality of complex terms, the logical model comprising relations between multiple generations of complex terms arranged in a hierarchical data structure; link the logical model to a physical component model comprising a plurality of physical data fields by mapping each physical data field of the plurality of physical data fields to at least one of a principal term and a complex term in the logical model as metadata; and automatically generate an interactive data dictionary for the payment processing system based on the metadata of the logical model corresponding to each physical data field in a database.

Further non-limiting embodiments or aspects will be set forth in the following numbered clauses:

Clause 1: A computer-implemented method comprising: determining a plurality of principal terms, each principal term of the plurality of principal terms representing at least one first attribute of a payment processing system; generating a plurality of complex terms, each complex term comprising a combination of at least two of the following: a principal term and an embedded complex term, each complex term representing at least one second attribute of a payment processing system; generating a logical model based on the plurality of principal terms and the plurality of complex terms, the logical model comprising relations between multiple generations of complex terms arranged in a hierarchical data structure; linking the logical model to a physical component model comprising a plurality of physical data fields by mapping each physical data field of the plurality of physical data fields to at least one of a principal term and a complex term in the logical model as metadata; and automatically generating an interactive data dictionary for the payment processing system based on the metadata of the logical model corresponding to each physical data field in a database.

Clause 2: The computer-implemented method of clause 1, wherein generating the plurality of complex terms comprises: determining a principal term based on at least one of the following: a physical data field, a physical data table, a physical file, a business term that cannot be further decomposed into component business terms, or any combination thereof.

Clause 3: The computer-implemented method of any of clauses 1-2, wherein generating the logical model comprises: identifying one or more entities with a unique role in a data set, and one or more attributes associated with each entity of the one or more entities, wherein each attribute defines a characteristic feature of an entity, and wherein each entity comprises a role in the hierarchical data structure.

Clause 4: The computer-implemented method of any of clauses 1-3, wherein the one or more entities are combined to form many-to-many relationships between an application and a set of tables, one or more fields, or one or more files.

Clause 5: The computer-implemented method of any of clauses 1-4, further comprising: displaying a graphical interface comprising a visualization of each respective relationship based on the logical model.

Clause 6: The computer-implemented method of any of clauses 1-5, wherein linking the logical model to a physical component model comprises: determining at least one linked data source for each of the at least one first attribute and the at least one second attribute.

Clause 7: The computer-implemented method of any of clauses 1-7, wherein the at least one linked data source comprises a link to metadata, the method comprising: determining at least a portion of a data definition based on the link to the metadata.

Clause 8: A system, comprising: at least one processor configured to: determine a plurality of principal terms, each principal term of the plurality of principal terms representing at least one first attribute of a payment processing system; generate a plurality of complex terms, each complex term comprising a combination of at least two of the following: a principal term and an embedded complex term, each complex term representing at least one second attribute of a payment processing system; generate a logical model based on the plurality of principal terms and the plurality of complex terms, the logical model comprising relations between multiple generations of complex terms arranged in a hierarchical data structure; link the logical model to a physical component model comprising a plurality of physical data fields by mapping each physical data field of the plurality of physical data fields to at least one of a principal term and a complex term in the logical model as metadata; and automatically generate an interactive data dictionary for the payment processing system based on the metadata of the logical model corresponding to each physical data field in a database.

Clause 9: The system of clause 8, wherein the at least one processor is further configured to: determine a principal term based on at least one of the following: a physical data field, a physical data table, a physical file, a business term that cannot be further decomposed into component business terms, or any combination thereof.

Clause 10: The system of any of clauses 8-9, wherein the at least one processor is configured to: identify one or more entities with a unique role, and one or more attributes associated with each entity of the one or more entities, wherein each attribute defines a characteristic feature of an entity, and wherein each entity comprises a role in the hierarchical data structure.

Clause 11: The system of any of clauses 8-10, wherein the one or more entities are combined to form many-to-many relationships between an application and a set of tables, one or more fields, or one or more files.

Clause 12: The system of any of clauses 8-11, wherein the at least one processor is configured to: display a graphical interface comprising a visualization of each respective relationship based on the logical model.

Clause 13: The system of any of clauses 8-12, wherein the at least one processor is configured to link the logical model to a physical component model by: determining at least one linked data source for each of the at least one first attribute and the at least one second attribute.

Clause 14: The system of any of clauses 8-13, wherein the at least one linked data source comprises a link to metadata, the at least one processor is further configured to: determine at least a portion of a data definition based on the link to the metadata.

Clause 15. A computer program product comprising at least one non-transitory computer-readable medium including one or more instructions that, when executed by at least one processor, cause at least one processor to: determine a plurality of principal terms, each principal term of the plurality of principal terms representing at least one first attribute of a payment processing system; generate a plurality of complex terms, each complex term comprising a combination of at least two of the following: a principal term and an embedded complex term, each complex term representing at least one second attribute of a payment processing system; generate a logical model based on the plurality of principal terms and the plurality of complex terms, the logical model comprising relations between multiple generations of complex terms arranged in a hierarchical data structure; link the logical model to a physical component model comprising a plurality of physical data fields by mapping each physical data field of the plurality of physical data fields to at least one of a principal term and a complex term in the logical model as metadata; and automatically generate an interactive data dictionary for the payment processing system based on the metadata of the logical model corresponding to each physical data field in a database.

Clause 16: The computer program product of clause 15, wherein the one or more instructions further cause the at least one processor to: determine a principal term based on at least one of the following: a physical data field, a physical data table, a physical file, a business term that cannot be further decomposed into component business terms, or any combination thereof.

Clause 17: The computer program product of any of clauses 15-16, wherein the one or more instructions further cause the at least one processor to: identify one or more entities with a unique role, and one or more attributes associated with each entity of the one or more entities, wherein each attribute defines a characteristic feature of an entity, and wherein each entity comprises a role in the hierarchical data structure.

Clause 18: The computer program product of any of clauses 15-17, wherein the one or more entities are combined to form many-to-many relationships between an application and a set of tables, one or more fields, or one or more files.

Clause 19: The computer program product of any of clauses 15-18, wherein the one or more instructions further cause the at least one processor to: display a graphical interface comprising a visualization of each respective relationship based on the logical model.

Clause 20: The computer program product of any of clauses 15-19, wherein the one or more instructions further cause the at least one processor to: determine at least one linked data source for each of the at least one first attribute and the at least one second attribute.

Clause 21: The computer program product of any of clauses 15-20, wherein the at least one linked data source comprises a link to metadata, and wherein the one or more instructions further cause the at least one processor to: determine at least a portion of a data definition based on the link to the metadata.

BRIEF DESCRIPTION OF THE DRAWINGS

Additional advantages and details are explained in greater detail below with reference to the non-limiting, exemplary embodiments that are illustrated in the accompanying schematic figures, in which:

FIG. 2 is a flow diagram for a method of determining a hierarchical model with an embedded complex term for modeling complex hierarchical metadata;

DESCRIPTION OF THE PREFERRED EMBODIMENTS

Figure 1:
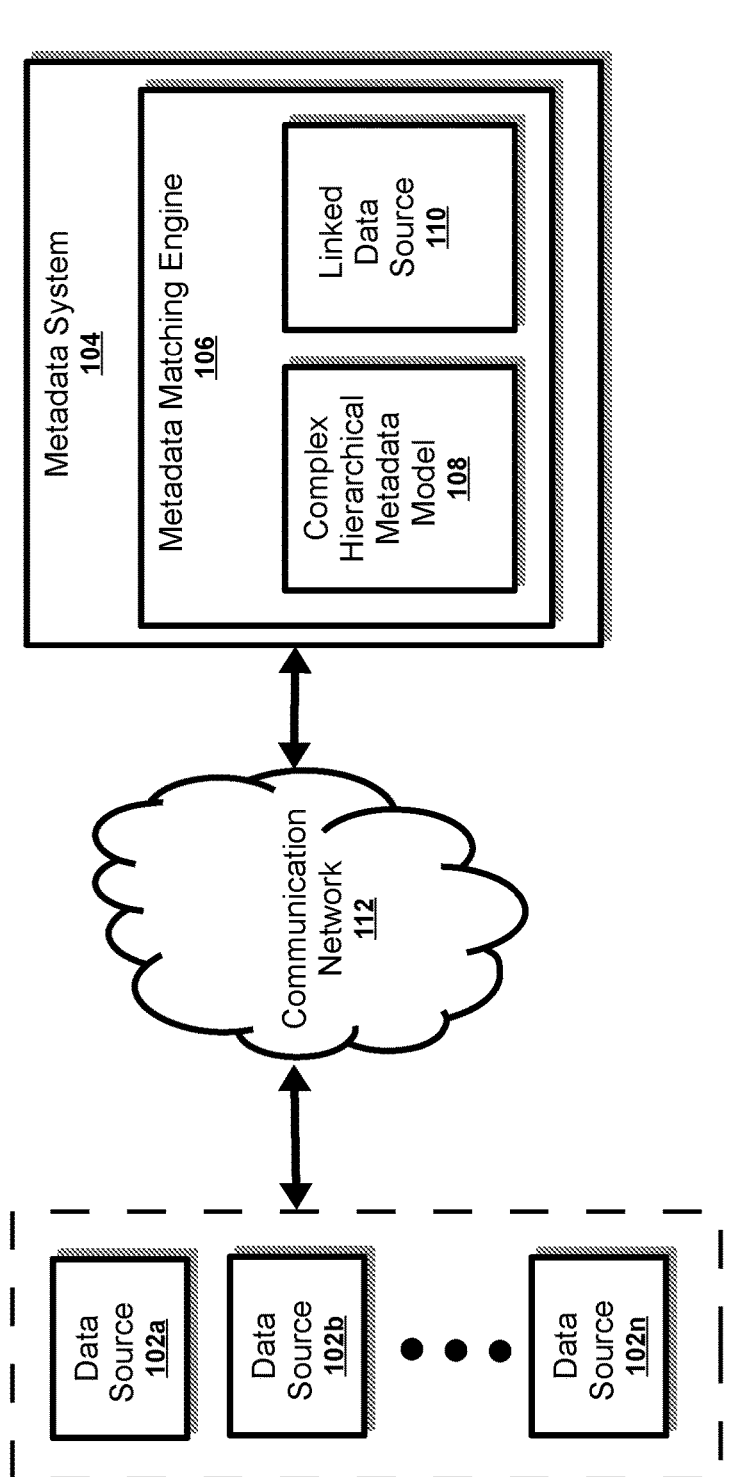
FIG. 1 is a schematic diagram of a system for modeling complex hierarchical metadata according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "modeling" may refer to the process of creating and designing structures, representations, and/or abstractions of systems or processes and/or developing conceptual or mathematical models that capture the essential aspects, context, and relationships of the systems or processes being applied to various domains, including data analysis, system design and implementation, decision-making, and forecasting.

As used herein, the term "physical data elements" may refer to the field names used in a table, file, and/or other physical data storage structures that represent the actual column or attribute names of the physical data storage system. For example, in a relational database, a table named "Customers" stores information about customers of a company, and/or the like. In such an example, the Customers table may include various physical data elements, each representing a specific attribute or characteristic of a customer. For example, physical data elements for the table may include a physical field name (e.g., CustomerID, etc.) stored with a description of the physical data element (e.g., represents the unique identifier for each customer, etc.). Such physical data elements may directly correspond to the actual column names in the physical representation of the table within the database system providing a concrete representation of the attributes or properties associated with the data stored in that table.

As used herein, the term "business term" may refer to a non-technical name or label assigned to a particular business attribute or concept, which provides a reference to a specific piece of information or business concept irrespective of the underlying physical data elements.

As used herein, the term "logical model" may refer to a structured and organized view of the data elements, entities, and their relationships, within a specific domain (e.g., data management, data governance, data warehouse, data ownership, data classification, data sensitivity such as confidential or proprietary information, data usage policies, data lineage, data quality, digital libraries, search engines, information retrieval, data integration, data asset management, etc.) and focuses on capturing business logic and business rules without being tied to any specific database implementation or technology.

As used herein, the term "physical model" may refer to the implementation-specific details of the database, including the physical field layouts of tables/files and other attributes related to the database management system (DBMS) instance, focusing on translating the logical model into a specific database technology, and accounting for considerations such as data types, indexing, storage optimizations, and performance tuning.

As used herein, the term "data definition language" (DDL) may refer to a language or a set of commands used to define and manage the structure of a database schema. DDL statements include statements for creating, altering, and deleting database objects such as tables, indexes, views, and constraints. DDL statements are used to specify the logical structure and attributes of the database objects.

As used herein, the term "governance" may refer to the overarching approval process and validation process under which metadata is created, assigned, or mapped.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, or output data, such as a processor, a display, a memory, an input device, a network interface, and/or the like. A computing device may be a mobile device. As an example, a mobile device may include a cellular phone (e.g., a smartphone or a standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, (e.g., a payment card, and/or may be electronic and used for electronic payments). The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services or access to goods and/or services to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that may be used to initiate a payment transaction.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "server" may refer to or include one or more computing devices that are operated by or facilitate communication and processing for multiple parties in a network environment, such as the Internet, although it should be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, satisfying a threshold may refer to a value (e.g., a score, a power consumption, etc.) being greater than the threshold, more than the threshold, higher than the threshold, greater than or equal to the threshold, less than the threshold, fewer than the threshold, lower than the threshold, less than or equal to the threshold, equal to the threshold, etc.

Existing systems provide ways to define the physical fields in a database by associating the appropriate business term and business definitions. One such technique uses metadata systems to capture or store metadata related to a database, including metadata relevant to a particular field, such as a field name, a purpose of the field, a data type, specific constraints or validations associated with the field, and/or the like. For example, in existing systems a physical field may be associated with a business definition of the business term. However, existing metadata systems may operate within existing constraints such that a complete representation of a metadata environment may not be possible. Existing systems may limit the understanding and usability of the metadata due to oversight and incompleteness. For example, the understanding and usability of the metadata when fields are overlooked, left uncaptured within a metadata system, or when a metadata system is incomplete, or limited at least with respect to certain aspects of a field. For example, metadata system may be incomplete or limited when a data field is not accurately reflected in the business definitions of a business term or are overlooked when the system is configured to focus on specific fields or tables of higher importance.

Additionally, existing systems may include only a single field mapped to a specific business term and therefore may not capture each of the relevant mappings or associations for the specified business term. For example, when the single physical field comprises multiple interpretations or usages across different business contexts and/or applications, it may not capture multiple mappings for business terms. The result may be an inaccurate mapping or incomplete representation of a field's meaning. Moreover, existing systems may not allow users to efficiently or automatically resolve data conflicts related to attribute names and types or create custom metadata types for integrating multiple enterprise systems. Existing systems may not provide sufficient and accurate insight or information to provide ability to interact with organizational structures.

In addition, existing systems may include insufficient business definitions for assigning to the physical fields that impact data understanding and decision-making, such as business definitions that may be inadequate or otherwise lack a sufficient level of detail, may include incomplete definitions that cause misunderstandings, and/or may include ambiguous business definitions that cause misinterpretations of the field's purpose or intended use. As a result, existing systems may not provide an automated way to separate and utilize different descriptions of data based on different types of metadata or its placement in a hierarchical model. Existing systems may not generate or build complete enterprise repositories, may be otherwise insufficient to accurately build, or may inaccurately build, enterprise repositories which operate on complex hierarchical models of metadata when changes to the database schema or the underlying business processes occur, may introduce discrepancies when the existing system is not regularly updated (e.g., becomes outdated, fails to reflect the current state of the database, etc.), and/or may cause inconsistencies between the metadata and the actual data structure.

Existing systems may not provide an automated way to separate and utilize different descriptions of data based on different types of metadata, to accurately determine a placement of metadata in a system comprising a hierarchal model, to accurately determine a field in a database that may serve different purposes or hold different meanings depending on the specific context in which it is used, or to efficiently and accurately build enterprise repositories based on complex hierarchical models of metadata. For example, existing systems may fail to effectively account for the management of metadata, do not provide efficient and accurate use of a modeling structure for data requirements, are incapable of efficiently and accurately eliminating redundancy, or may further increase inefficiencies and excesses for storage, execution, and use of data definitions that are duplicated across multiple systems and associated with increased processing as a result of the inability to interact and manage complex metadata.

Using non-limiting embodiments described herein, organizations may efficiently and automatically resolve data conflicts based on attribute names and attribute types. Organizations may create custom metadata types to apply complex metadata while integrating a plurality of enterprise systems together. In addition, organizations may generate or label a complex hierarchical model through the efficient and accurate use of a modeling structure based on data requirements of an enterprise system. Organizations may generate or build enterprise repositories based on complex hierarchical models, such as systems using cloud warehouse data, integration data, modeling data, integration tool data, and/or the like. For example, organizations may build enterprise repositories including a hierarchy by which organizational structures are connected (e.g., integration points, shared information, data definitions, etc.), such as multi-generational connections of complex business terms that provide a recursive thread through a hierarchical model. Organizations may also eliminate or reduce a need to explicitly describe, level, or track complex business terms (e.g., a position of a complex term, etc.) in an organizational hierarchy. In addition, information and/or knowledge about each hierarchical model may be decomposed into a base case (e.g., a less-complex case, etc.) based on the characteristics (e.g., a thread of business terms, etc.) in the multiple generations of complex business terms. For example, all the remaining entities may be decomposed into principal business terms to minimize or optimize storage of redundant data and redundant data definitions (e.g., definitions that are duplicated across multiple systems, etc.).

Additionally, or alternatively, the hierarchical model may include a data model defining a data dictionary for one or more metadata systems based on cloud data, cloud warehouse data, integration data, modeling data, or data integration tool data, such as a complex hierarchical model that provides a metadata system for generating, storing, and loading different descriptions of data based on an association with different types of metadata, a position (e.g., placement, etc.) in a hierarchical model, and/or the like.

Additionally, or alternatively, the metadata system provides a structure of a data storage system sufficient to enable efficient data retrieval or manipulation, create queries for performing data transformations, extract meaningful insights from the stored data, combine multiple principal business terms to represent a specific variation of a product that captures the base product SKU, variant attributes (size and color), or unique identifiers for the variant SKU. Additionally, the metadata system provides a more comprehensive and structured representation of the data and relationships within the domain and provides sufficient details for implementing the logical model in a specific DBMS. In this way, the metadata system ensures that the data is structured and stored efficiently based on the chosen DBMS technology and its requirements and incorporates additional details related to the specific database technology. This also ensures that the metadata system provides optimization aspects based on factors such as storage mechanisms, indexing strategies, performance tuning, and other DBMS-specific configurations. In this way, the physical model complements the logical model. Moreover, by translating the logical structure into a specific DBMS implementation, the DDL statements may define a structure of the tables and other database objects, while a physical model may account for the technical implementation and optimization aspects of the database in a specific DBMS environment. The physical model may also use hierarchies associated with business terms to provide a structured framework for data organization, analysis, reporting, or decision-making to enable efficient and accurate data navigation, aggregation, or drill-down capabilities. The physical model may also allow users to explore data at different levels of abstraction and gain accurate insights into the hierarchical relationships between data elements.

Referring now to FIG. 1, shown is a diagram of an example environment 100 in which devices, systems, methods, and/or products described herein may be implemented, including data source 102a-102n (referred to collectively as "data sources 102" and individually as "data sources 102"), metadata system 104, metadata matching engine 106, complex hierarchical metadata model 108, linked data source 110, and communication network 112. In some non-limiting embodiments or aspects, data source 102 and/or metadata system 104 and/or complex hierarchical metadata model 108 may interconnect (e.g., establish a connection to communicate and/or the like) via wired connections, wireless connections, or a combination of wired and wireless connections. In some non-limiting embodiments or aspects, metadata system 104 may form a link (e.g., establish a limited or asynchronous communication and/or the like) between one or more of data sources 102 and complex hierarchical metadata model 108 and/or linked data source 110 via wired connections, wireless connections, or a combination of wired and wireless connections.

Data sources 102 may include one or more data storage devices configured to store data source 102a-102n, including one or more source data fields, and may be in communication with complex hierarchical metadata model 108 via communication network 112. For example, data sources 102 may be the source or location of the metadata (e.g., a file, a particular database on a DBMS, a live data feed, and/or the like). Data sources 102 might be located on the same computing device as metadata system 104, complex hierarchical metadata model 108, or another computing device accessible via a network. In some non-limiting embodiments or aspects, data sources 102 may be associated with a particular aspect of related data source 102a-102n, such as a data dictionary that describes a table definition, as well as one or more individual field definitions of a data table. Data sources 102 may also include one or more processors associated with a particular type of metadata, such as lineage metadata, business definition metadata, transformation metadata, operational metadata, access metadata, profile metadata, and/or structural metadata.

In some non-limiting embodiments or aspects, metadata system 104 stores, interprets, and generates metadata. For example, metadata system 104 operates on a set of data that describes and provides information about other data. In an example, metadata matching engine 106 of metadata system 104 is configured to facilitate analysis results by modeling output into context with supporting information. For example in metadata matching engine 106, the perspective of the user may be considered when gathering information (e.g., based on questions, answers to the questions, etc.). The specific information being requested may vary greatly depending on a user perspective. Detailed subject matter covered by the overall metadata topic may be quite expansive and/or diverse. To reduce the scope of metadata, metadata matching engine 106 may specifically identify a use case or scope for the specific metadata or metadata tool. Metadata matching engine 106 operates on a set of data that provides information about other data, and in doing so, arrives at a set of data used to obtain or convey context and information about other data as a means to understand, interpret, utilize the underlying data effectively, and/or the like.

Complex hierarchical metadata model 108 may be generated, stored, transmitted, or accessed by metadata system 104 (e.g., one or more processors of metadata system 104, a memory structure of metadata system 104, one or more processors of metadata matching engine 106, etc.). Complex hierarchical metadata model 108 may be generated by metadata system 104 to include one or more hierarchical data structures defining a set of business terms based on entities and attributes within an organizational data set. In some examples, metadata system 104 may generate or determine relationships within a framework of business terms (e.g., a business term (BT) framework). In addition, metadata system 104 organizes the BT framework based on relationships, such as grouping BTs into complex BTs based on relationships of elements in the data (e.g., a complex BT, a combination of principal BTs defining a BT, and/or the like). The BT framework may also include target-oriented clusters (e.g., one or more clusters that are based on various aspects of the data, such as a data type, one or more transactional attributes, a merchant, an identity of a bank cardholder, one or more identified products, one or more identified services, one or more authentication services, and/or the like).

In some non-limiting embodiments or aspects, metadata system 104 generates a principal BT (e.g., a BT that cannot be further sub-divided, etc.). For example, metadata matching engine 106 determines that a principal BT may be used alone or as part of a complex BT, such as "Issuer Bank Identifier Number (BIN) Owner Business Identifier Number (BID) Region Code". In such an example, region code comprises a closed domain of values from which to determine an attribute or the standard region code includes a region code selected from a domain (e.g., $\{0, 1, 2, 3, 4, 5,$ and $6\}$, etc.). In this example, the principal BT may be based on an attribute or entity with a defined domain.

In some non-limiting embodiments or aspects, metadata system 104 generates a complex BT (e.g., a composition of multiple other BTs, etc.). In the above example, metadata matching engine 106 determines the issuer BIN is represented by a complex BT that may be decomposed to multiple principal BTs, such as BIN, Issuer, and/or the like. Each BT, including both principal BTs and complex BTs, comprise a separate business definition. Additionally, since BTs may be composed of other BTs (e.g., complex BTs), the complex hierarchical metadata model 108 may be self-referencing and recursive in nature. As an example, the complex BT defined as "BIN BID Region Code" includes a multi-generational composition of complex BTs. In such an example, in order to decompose the original complex BT, metadata matching engine 106 also decomposes two children BTs of the original BT.

In some non-limiting embodiments or aspects, metadata matching engine 106 determines a multi-generational composition. In an example of a multi-generational composition, any complex term may be made up of other complex BTs and principal BTs, and thus, each next generation having a complex term, may comprise either complex BTs or principal BTs. In such an example, the multi-generational composition may provide multiple generations (e.g., levels, nodes, dimensions, etc.) until each of the remaining entities are principal. The multi-generational aspect of a complex BT generates a recursive thread, such that the complex hierarchical metadata model 108 does not need to explicitly describe the number of levels or the positioning of complex BTs in a hierarchy, the metadata matching engine 106 does not require knowledge of the number of hierarchical levels, and metadata matching engine 106 may decompose complex hierarchical metadata model 108 based on the characteristics of the recursive thread formed through the multiple generations of complex BTs. In such an example, the recursive thread is completed and the decomposition is complete (e.g., and processing stops, etc.) when each of the remaining entities have been decomposed into principal BTs, thus defining and forming a base case.

In some non-limiting embodiments or aspects, metadata system 104 may connect one or more data sources 102 as linked data source 110, or alternatively, any other computing device (e.g., an admin device, a user device, etc.) in communication with data sources 102 may be connected via communication network 112. For example, linked data source 110 may include a link to one or more storage devices, such as a server, a group of servers, an RDBMS and/or the like, that include a data dictionary for a table or field related to data stored in data sources 102. In some non-limiting embodiments or aspects, linked data source 110 may be associated with a portion of an organizational entity managing (e.g., controlling, etc.) one or more transactions, such as one or more payment transactions, one or more reward transactions, one or more real estate transactions, one or more shopping transactions, and/or the like.

In some non-limiting embodiments or aspects, metadata system 104 may generate metadata by identifying one or more use cases and a scope identifying specific needs of the users based on the context in which complex hierarchical metadata model 108 may be utilized. For example, metadata is implemented to assure that the metadata addresses the relevant aspects of the data, provides the necessary information, and aligns with the intended objectives of the implemented system. For example, metadata system 104 develops a system based on a metadata solution that is tailored to the specific requirements, improving efficiency and accuracy in combination with usefulness, effectiveness, or user satisfaction. By defining the scope, the metadata tool may prioritize or address the most critical aspects for the intended use cases, avoiding unnecessary complexity, and ensuring efficient utilization of resources to address the needs of the users, provide relevant information, or deliver value in the context of the specific data analysis, modeling, reporting, or other objectives.

In some non-limiting embodiments or aspects, metadata system 104 generated a data dictionary that describes the table definition and field definitions for one or more data stores. The data dictionary may include business definitions, data relationships, field profiles, origin information, and usage details, to provide a comprehensive understanding of the data structure and meaning, facilitating data governance, compliance, and data-driven decision-making.

In some non-limiting embodiments or aspects, metadata system 104 generates or provides field level lineage that may track the lineage of each field, capturing information about its source and downstream usage. As an example, a privacy program may be implemented to identify where personal information (PI) is located within a company's data landscape. Specifically, for specified fields, lineage information may help minimize the need for scanning or ensure privacy compliance.

In some non-limiting embodiments or aspects, metadata system 104 provides modeling support to assist data engineers and modelers in making field choice decisions by providing contextual information. For example, in some instances, the complexity of a company data model may trigger an action to provide guidance and recommendations for selecting one or more correct fields for specific modeling requirements, to ensure accurate and efficient data modeling.

In some non-limiting embodiments or aspects, metadata system 104 generates an aggregation filter, including a one or more integration criteria that may reconcile data discrepancies in reports originating from different data sources, metadata system 104 may provide integration analysts with filtering criteria for each source data set or table. In such an example, this information may help analysts understand and align the filtering criteria used in different reports, aiding in data reconciliation, and ensuring consistent reporting.

In some non-limiting embodiments or aspects, metadata system 104 provides training support as a key resource for training and baselining new employees with an understanding of the different data sources within a company. For example, metadata system 104 may provide insights into the usage metrics of data, allowing users to make informed decisions on schema evolution, data retirement, and optimizing data usage for various business requirements.

In some non-limiting embodiments or aspects, metadata system 104 tracks and documents changes in the evolution of the data schema over time. For example, metadata system 104 captures information about added or deprecated fields, when these changes occurred, and any associated metadata modifications to provide a history of schema evolution and the metadata's evolution, maintaining data lineage, and ensuring backward compatibility when working with historical data.

In some non-limiting embodiments or aspects, metadata system 104 generates payment system tables, such as a table named OrderDetails, to include metadata for finding a customer order. Metadata system 104 generates OrderDetails to include the details of orders, such as physical data elements representing different attributes of an order. For example, CustomerID and OrderDate, which may be used in combination for querying a customer's order on a specified date and providing a detailed representation of one or more specific attributes associated with the order details in an e-commerce system to enable and ensure the storage, retrieval, and analysis of essential information related to each order. For example, product details, quantities, pricing, customer information, and/or order-related timestamps may serve as a foundation for performing various operations on the e-commerce data, including generating reports, analyzing sales trends, calculating revenue, and personalizing customer experiences.

In some non-limiting embodiments or aspects, metadata system 104 generates one or more BTs, for example, OrderQuantity, as a label for a quantity of a product ordered that is associated with different physical data elements across multiple tables, each representing a specific aspect of the order quantity within an order system. In this example, metadata system 104 provides a standardized BT, where the meaning of the attribute is understandable regardless of the specific physical field names or data structures used in the underlying database. This abstraction provided by the BT provides clarity in discussions, documentation, and analysis of information related to the order quantity attribute.

In some non-limiting embodiments or aspects, metadata system 104 may model, generate, or execute a system implemented for defining and structuring a data schema, including the selection of fields or attributes, the establishment of relationships between data elements, and the generation of specific rules, characteristics, or constraints governing the data. To facilitate field selections for systems and processes, modeling provides guidance, information, and context to data engineers and modelers for informing and selecting fields or attributes from the available data sources and ensures that the chosen fields align with the intended objectives, data requirements, and business rules. In addition, modeling plays a crucial role in understanding a data landscape (e.g., a representation of an organization's data assets, storage options, systems for creating, processing and storing data, and other applications present in an enterprise's data environment, etc.), capturing the relevant aspects of the data, and facilitating effective data reporting and decision-making by providing insights, identifying patterns, and deriving inferences associated with the data based on a structured representation that reflects the underlying relationships and characteristics of the data.

As an example, a BT and its corresponding physical data elements in the customer example may include a BT, such as OrderQuantity defined as a quantity of a product ordered by a customer and associated with multiple physical data elements (e.g., order quantity from an OrderDetails table, ProductQuantity from a Product table, ShippedQuantity from a Shipment table, etc.).

In some non-limiting embodiments or aspects, metadata system 104 models, generates, and/or stores complex BTs that refer to a composition of multiple elementary and/or principal BTs. The complex BTs represent specific details associated with the concepts or entities in a specific business domain. The complex BTs may be modeled or generated to capture relationships, hierarchies, composite attributes, and/or the like. As an example of a complex BT, ProductVariantSKU may be modeled to define a distinct variation or option of a product that differs in attributes such as size, color, or style. In such an example, ProductVariantSKU may include a principal BT (e.g., ProductSKU, etc.), a principal BT (e.g., VariantAttributes, etc.) for a unique identifier for defining the specific attributes that differentiate the variant for the base product (e.g., size, color, material, etc.), and a principal BT (e.g., VariantSKU, etc.) for a unique identifier assigned to the specific variant. In such an example, ProductVariantSKU may define one or more complex BTs for a t-shirt variant composed of ProductSKU: SKU1234, VariantAttributes: Size—Medium, Color—Blue, and VariantSKU: SKU1234-M-BL. In this example, metadata system 104 models, generates, or stores the complex BT to combine multiple principal BTs to represent a specific variation of a product to capture the base product SKU, variant attributes (size and color), or a unique identifier for the variant SKU and may provide a more comprehensive and structured representation of the data and relationships within the domain.

In some non-limiting embodiments or aspects, metadata system 104 decomposes complex BTs into their constituent elementary BTs or principal BTs before modeling relationships between them to create a structured representation of the data elements in the complex BT and their interdependencies. For example, a complex BT (e.g., OrderItemVariantSKU, etc.) may be modeled as a single item that is part of an order representing a specific product variant. In this example, the constituent components may include a complex BT (e.g., ProductVariantSKU, etc.) representing a specific variation of a product and may be decomposed to a first principal BT (e.g., ProductSKU, etc.), a second principal BT (e.g., VariantAttributes, etc.), a third principal BT (e.g., VariantSKU, etc.), and two elementary BTs (e.g., Quantity, UnitPrice, etc.) representing the quantity and/or price of the product variant ordered. In such an example, complex BT OrderItemVariantSKU represents an item within an order, and through decomposition, the principal BT ProductVariantSKU is identified as one of its components. In addition, elementary BTs such as Quantity and UnitPrice are also part of the OrderItemVariantSKU definition. In this example, metadata system 104 decomposes the complex BT to expose the plurality of BTs of ProductVariantSKU. By decomposing the complex BT, metadata system 104 may create a clear and structured understanding of the various BTs involved in the domain, define relationships and dependencies, and/or may be used to further generate conceptual models (e.g., models that capture the entities and data elements in a high-level, business-oriented manner, etc.), logical models (e.g., models that describe the entities, structures, and relationships of a database-agnostic way, focusing on the business logic, etc.), and physical models, representing the database and/or other structures specific to the implementation details. Metadata system 104 may decompose the complex BT to generate new views (e.g., conceptual views, logical views, physical views, etc.) of a data model and provide a comprehensive representation of the data and its relationships.

In some non-limiting embodiments or aspects, metadata system 104 models, generates, and/or stores a logical model including a clear representation of the entities, attributes, and relationships and allow stakeholders a high-level understanding of the structure and behavior of the data for further steps in the data modeling process, such as database design and implementation. The logical model may comprise entities, attributes, and/or relationships which define a structure and behavior of the data in the context of a practical implementation and provide information to clarify one or more data requirements, define one or more data integrity rules, provides links or information communication for sharing information between business teams/technical teams, and/or the like. In an example with four entities (customer, order, product, and category), each entity may have a set of attributes which describe its properties (e.g., customer entity includes attributes like CustomerID, FirstName, LastName, Email, Address, etc.). The relationships between entities may define how each entity is related to each other entity. For example, metadata system 104 may determine a one-to-many relationship between customer and order indicating that a customer may have multiple orders. Similarly, there may be a many-to-many relationship between order and product to represent, for example, that an order may contain multiple products, that a product may be part of multiple orders (e.g., one-to-many), and/or that they may belong to a specific category (e.g., one-to-one).

In some non-limiting embodiments or aspects, metadata system 104 models, generates, and/or stores a physical model representing an actual structure, storage mechanisms, or access methods for the stored data. For example, the physical model may account for location information (e.g., a DBMS instance where the database is hosted), aspects for identifying a specific database server or schema, relevant configuration details related to the database environment, and/or the like. In addition, the physical model may be generated to provide one or more details for implementing the logical model in a specific DBMS. Metadata system 104 may also generate a physical model to ensure that the data is structured or stored efficiently based on the chosen DBMS technology requirements. Metadata system 104 may also incorporate additional details related to the specific database technology, such as optimization aspects formed from factors related to DBMS storage mechanisms, indexing strategies, performance tuning, other specific configurations, and/or the like. In this way, metadata system 104 models, generates, or stores a physical model which complements a logical model by translating the logical structure into a specific DBMS implementation.

In some non-limiting embodiments or aspects, metadata system 104 generates an Order Table to include a plurality of fields, including an OrderID field (e.g., Primary Key to the order table, data type of integer, etc.), a CustomerID field (e.g., Foreign Key referencing CustomerID, data type of integer, etc.), an OrderDate field (e.g., a date type, etc.), TotalAmount (e.g., a decimal data type, etc.), and/or the like so that each field may be associated with a specific data type that reflects the type of data it may store (e.g., CustomerID and OrderID of type Integer, FirstName and LastName of type Varchar, OrderDate of type Date, other attributes such as primary keys or foreign keys to enforce data integrity or define relationships between tables, etc.).

In some non-limiting embodiments or aspects, metadata system 104 models, generates, and/or stores DDL statements that may be used to create tables or define their structure, such as a statement specifying the table name followed by a list of columns with their respective data types and each constraint associated with the table or the specific fields of a table. For example, a CustomerID column in the Orders table specifies a data type of integer or is designated as a primary key for the table. The physical model provides the implementation-specific details or considerations for the database in the DDL statements that may integrate the logical structure or definition of the database objects and describes the schema or attributes of the tables, including column names, data types, constraints, or relationships. Thus, the DDL statements define the structure of the tables or other database objects while the physical model addresses the technical implementation and optimization aspects of the database in a specific DBMS environment.

In some non-limiting embodiments or aspects, metadata system 104 generates a database structure based on the DDL statements, schema, data types, relationships, constraints, and/or the like that govern the organization and behavior of the data within the database. DDL statements are executed by the DBMS to create or modify the database structure. For example, metadata system 104 creates a data table based on DDL statements to generate or modify the structure of the order table (e.g., CREATE TABLE Orders (OrderID INT PRIMARY KEY, CustomerID INT, OrderDate DATE, TotalAmount DECIMAL, FOREIGN KEY (CustomerID) REFERENCES Customers (CustomerID)).

In some non-limiting embodiments or aspects, metadata system 104 models, generates, and/or stores a hierarchical data model. For example, metadata system 104 models, generates, or stores BTs in a hierarchical data model, such as a structured arrangement or classification of data elements based on levels of abstraction, importance of the field, relationship with other tables or fields, and/or the like. In an example, metadata system 104 models, generates, and/or stores a hierarchical data model within a specific domain (e.g., a business context, etc.) that represents a hierarchical structure taxonomy that organizes and groups related terms or concepts in a logical and hierarchical manner. BTs that are commonly used for organizing or categorizing various entities, such as products, customers, employees, accounts, or organizational units, may be used to provide a way to represent the relationships and dependencies between different levels of data elements within a specific domain.

In some non-limiting embodiments or aspects, metadata system 104 models, generates, and/or stores a product hierarchy, where products may be organized into a hierarchical structure based on categories, subcategories, or product attributes. For example, a product hierarchy in a clothing store may have levels such as: Apparel>Men's Clothing>Shirts>Casual Shirts>T-shirts. In another example, an organizational hierarchy represents a structure of a company such as Company>Divisions>Departments>Teams>Employees, the reporting relationships, the hierarchical levels within the organization, and/or the like. A customer hierarchy may be used for a customer relationship management (CRM) system or may be organized into a hierarchical structure to represent parent-child relationships of a business-to-business context with customers grouped into accounts or parent companies and with individual contacts or subsidiaries represented as child elements. In an example of a geographic hierarchy, metadata may be modeled to organize locations based on different levels, such as Continent>Country>Region>City>Postal Code, for territory management, targeted marketing activities, and/or the like.

Additionally, metadata system 104 models, generates, or stores hierarchies of BTs to provide a structured framework for data organization, analysis, reporting, or decision-making, to enable efficient data navigation, aggregation, or drill-down capabilities, and to allow users to explore data at different levels of granularity or gain insights based on the hierarchical relationships between data elements.

In some non-limiting embodiments or aspects, metadata system 104 transforms data. For example, metadata system 104 executes one or more transformation rules with specific instructions or operations that are applied to data during the process of transforming it from one format, structure, or representation to another format, structure, or representation. The transformation rules may include programming to determine how data should be manipulated, converted, and/or processed to meet the desired outcome or target format. Transformation rules may encompass a variety of operations.

In some non-limiting embodiments or aspects, metadata system 104 transforms data using data formatting rules. For example, metadata system 104 transforms data using data formatting rules to define the specific format, layout, or structure of data elements, such as converting dates to a standardized format or applying consistent naming conventions. These transformation rules are typically formed and documented as part of one or more data integration processes, data mapping exercises, ETL (extract, transform, and load) workflows to guide the transformation of data from its source format to the desired target format, ensuring that the data meets the intended requirements and aligns with the desired data model or schema. By defining transformation rules, organizations may automate and standardize the data transformation process enabling efficient data integration, data quality improvements, or supporting the overall data management and analytics initiatives.

In some non-limiting embodiments or aspects, metadata system 104 transforms data using data cleansing rules for removing or correcting inconsistencies, errors, or anomalies in the data, such as eliminating duplicate records, handling missing values, or normalizing data.

In some non-limiting embodiments or aspects, metadata system 104 transforms data using data aggregation rules for combining multiple data elements or records into a single summarized representation, such as calculating totals, averages, or other aggregations.

In some non-limiting embodiments or aspects, metadata system 104 transforms data using data filtering rules for selecting or excluding specific data based on predefined criteria or conditions, such as filtering out irrelevant or erroneous data.

In some non-limiting embodiments or aspects, metadata system 104 transforms data using data joining or merging rules for combining data from different sources or tables based on common attributes or keys to create a unified dataset.

In some non-limiting embodiments or aspects, metadata system 104 transforms data using data calculation or derivation rules for performing mathematical or logical calculations on data to derive new values or indicators, such as computing percentages, ratios, or creating derived measures.

In some non-limiting embodiments or aspects, metadata system 104 transforms data using data mapping rules for establishing correspondences or mappings between data elements in different formats or systems, ensuring consistency or interoperability.

In some non-limiting embodiments or aspects, metadata system 104 transforms data using data encryption or masking rules for applying cryptographic techniques or data masking methods to secure sensitive data, protecting privacy or complying with security requirements.

Communication network 112 may include one or more wired and/or wireless networks. For example, communication network 112 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, a single system or a single device shown in FIG. 1 may be implemented as multiple, distributed systems or devices. Additionally, or alternatively, a set of systems or a set of devices (e.g., one or more systems, one or more devices) of environment 100 may perform one or more functions described as being performed by another set of systems or another set of devices of environment 100.

Referring now to FIG. 2, a flow diagram is shown for process 200 according to non-limiting embodiments or aspects. Process 200 shown in FIG. 2 is for example purposes only. It should be appreciated that fewer, additional, different, and/or a different order of steps may be performed in non-limiting embodiments. At step 202, process 200 may include determining a plurality of principal terms each principal term of the plurality of principal terms representing at least one first attribute of a payment processing system. For example, in some non-limiting embodiments or aspects, metadata system 104 determines a plurality of principal terms from data sources 102. Metadata system 104 (e.g., one or more processors of metadata system 104, etc.) may determine each principal term of the plurality of principal terms representing at least one first attribute of a payment processing system from a plurality of principal terms stored in data sources 102. A computing device of data sources 102 (e.g., one or more processors of data sources 102, etc.) may determine each principal term of the plurality of principal terms representing at least one first attribute of a payment processing system. Data sources 102 (e.g., a computing device thereof) may determine a first attribute that corresponds to an attribute of the data.

In some non-limiting embodiments or aspects, metadata matching engine 106 may determine the at least one first attribute of a payment processing system that represents a specific characteristic or property of a data element within a database or dataset that provides additional information about the data element and further defines its characteristics, behavior, or meaning. The at least one attribute may describe and classify data elements which correspond to a specific aspect or quality of the data element. Attributes may be associated with data elements to provide context, structure, or organization to the data. Attributes may contribute to an understanding of the semantics of the data and support data modeling, data integration, data analysis, or other data management activities.

Metadata matching engine 106 may determine at least one attribute to identify. The at least one attribute may include information such as a name or an identifier of an attribute, which serves as a unique reference to the specific characteristic or property it represents. Metadata matching engine 106 may determine a specific type or format of data that the attribute holds, such as a string, an integer, a date, a boolean, and/or the like. Metadata matching engine 106 additionally determines the type of data that may be stored in the attribute, each operation that may be performed on it, a textual description or explanation of the attribute, and additional details associated with a purpose, meaning, or usage. In such an example, each specific rule or limitation applies to an attribute, such as a minimum or maximum value, allowed value range, format restrictions, and/or the like. An optional value may be assigned to the attribute when no other value is specified. The relationships or associations between the attribute or other attributes or entities may be stored in the database schema associated with data source 102a-102n.

In some non-limiting embodiments or aspects, metadata system 104 may provide linked data source 110 that links to a relational database (e.g., an RDBMS, a DBMS, etc.) that includes attributes associated with database tables, fields, objects, and/or the like. For example, each column of linked data source 110 may represent an attribute of the data stored in the corresponding table and define its characteristics and properties. In such an example, organizations may more effectively manage or utilize their data assets or ensure consistent interpretation and usage of data across different applications or systems.

In some non-limiting embodiments or aspects, metadata system 104 provides end-to-end metadata based on a hierarchical recursive model (e.g., a multi-generational aspect of a hierarch that generates a recursive thread, such that a model may not need to explicitly describe the number of levels or the positioning of complex BTs in a hierarchy to capture BTs, etc.). In some examples, metadata system 104 provides a maintenance process for a logical model.

In some non-limiting embodiments or aspects, metadata matching engine 106 may expose (e.g., publish, transmit, etc.) field transformation rules or incorporate them into complex hierarchical metadata model 108. For example, coupling of logical transformation rules and physical code ensure logical transformation rules are closely aligned with the physical code implementation to minimize deviations.

In some non-limiting embodiments or aspects, metadata matching engine 106 may provide enterprise-wide field mapping by mapping physical fields to one or more BTs across an organization.

In some non-limiting embodiments or aspects, metadata matching engine 106 may propagate mappings based on transformation rules. In addition, metadata system 104 captures operational metadata to enhance (e.g., increase, elevate, etc.) understanding and management of metadata.

In some non-limiting embodiments or aspects, metadata matching engine 106 schedules or performs ad hoc profiling to gain insights into the organizational data (e.g., data insights refer to the deep or profound understanding an organization gains from analyzing information on a particular issue and make informed decisions rather than relying on instinct, etc.).

In some non-limiting embodiments or aspects, metadata matching engine 106 may provide enterprise-wide field mapping based on different types of metadata that explain what is being described and how that data can be used. For example, lineage metadata identifies the origins, transformations, or movements of data, throughout its lifecycle, providing a historical record of data lineage (e.g., a historical record of data lineage) or information about the data's source, processing steps, transformations, data entry application, data integration processes, or data import from external systems. Lineage metadata may also capture any subsequent transformations or mappings applied to the field, such as data cleansing or formatting operations. For example, data lineage metadata may track a source of the data in the CustomerName field, such as whether it was manually entered by users, imported from another system, or derived through a data transformation process.

In some non-limiting embodiments or aspects, business definition metadata provides business-oriented explanations or interpretations of data elements (e.g., field, column, table, file, system, etc.) describing their meaning, context, or significance in BTs. For example, business definition metadata for the CustomerName field may include a clear and concise description of what CustomerName represents, such as a legal name of the customer as per their official identification documents to help business users understand the purpose and interpretation of the field.

In some non-limiting embodiments or aspects, transformation metadata describes the processes, rules, and/or operations applied to transform, enrich, and/or normalize data from one state to another, providing details about data transformations or manipulations. For example, transformation metadata may capture information about any data transformations or derivations applied to the CustomerName field, such as concatenating first name and last name fields, removing leading/trailing spaces, standardizing the formatting, and/or the like.

In some non-limiting embodiments or aspects, operational metadata provides information about the operational aspects of data, including data processing, data quality, performance, or usage statistics. For example, operational metadata may include details such as the date or time of the last data update or modification, the frequency of data changes, data quality metrics (e.g., completeness, accuracy, etc.), or usage statistics (e.g., number of times the field was accessed, etc.).

In some non-limiting embodiments or aspects, descriptive metadata provides information that describes the characteristics and properties of data elements, such as their purpose, content, or format. In a field-related example, descriptive metadata may encompass the purpose of each field, such as CustomerName representing the name of the customer. It could also include additional information like the data type of the field (e.g., text), the maximum length of the field, and/or any specific validations associated with it.

In some non-limiting embodiments or aspects, access metadata includes information related to the administration and management of data access. The access metadata may specify permissions, privileges, or restrictions for users or groups accessing the data. The access metadata may specify permissions, privileges, or restrictions for database management, such as ownership permissions, versioning information, or security controls. In the field-related example, access metadata could include details about who owns the database, who has access permissions to view or modify the field, who has read or write access to the field, any access control policies or restrictions, and the roles or user groups authorized to view or modify the field, or any data retention policies or security measures associated with it.

In some non-limiting embodiments or aspects, profile metadata (or technical metadata) maintains technical details about data elements, including their storage, encoding, data formats, or data processing requirements. Profile metadata provides statistical information or summaries about the data, including data distributions, patterns, or quality insights. For example, profile metadata may include statistical summaries such as the number of distinct names, average name length, most frequent names, the number or frequency of data quality issues detected (e.g., missing values, inconsistent formats), information about how the data is stored, the specific table or column where the field is located, the number or frequency of indexing (e.g., performance, etc.) improvements associated with the field, and/or the like.

In some non-limiting embodiments or aspects, structural metadata describes the organization and arrangement of data elements within a database or data repository. For example, structural metadata may include information about the database schema, the tables, the relationships between tables, or the fields within each table. Structural metadata defines the overall structure of the database, such as the relationships between the Customer table or other related tables like Orders or Addresses.

In some non-limiting embodiments or aspects, metadata system 104 generates metadata by design based on an integrated metadata matching engine 106 that captures the overall design and development process to ensure consistency between the physical code, metadata, and/or resulting data sources 102. In some examples, metadata matching engine 106 generates mandatory metadata for production install based on certain baseline metadata, such as field level lineage, field level definitions, mandatory prerequisites for production installation, and/or the like. In this way, complex hierarchical metadata model 108 may provide important information for related executable code to allow and enhance post-process data usage and quality. For example, metadata matching engine 106 resolves missing, inaccurate, and/or invalid metadata as high-severity issues requiring prompt resolution. In some examples, standard interfaces for metadata are incorporated by design and a set of metadata interfaces and standards implemented to identify required metadata prior to implementation. For example, metadata system 104 ingests metadata to allow data flow from sources where direct sourcing is not possible. As an example, to allow data flow from sources where direct sourcing is not possible, metadata matching engine 106 provides an ingestion application programming interface (API) for communicating (e.g., interfacing, etc.) with the metadata repository to create a closed loop system where metadata is created first and then used, such as to generate code. In such an example, the ingestion API for external metadata includes metadata sources that may be part of new systems and include other metadata mappings (e.g., important external mappings maintained, etc.).

In some non-limiting embodiments or aspects, metadata system 104 publishes or deploys an API for metadata subscriptions for supporting use cases such as a data dictionary to provide robust metadata management in a framework that aligns metadata with the overall development process and ensures data consistency and quality.

As shown in FIG. 2, at step 204, process 200 may include generating a plurality of complex terms, each complex term comprising a combination of at least two of: a principal term and an embedded complex term (e.g., two or more principal BTs, two or more embedded complex BTs, at least one principal BT and at least one embedded complex BT, etc.), each complex term representing at least one second attribute of a payment processing system. For example, in some non-limiting embodiments or aspects, metadata matching engine 106 generates a plurality of complex BTs, for example a plurality of complex BTs are generated in data source 102a, each complex BT comprising a combination of at least two of: a principal BT and an embedded complex BT, each complex BT representing at least one second attribute of a payment processing system.

In some non-limiting embodiments or aspects, generating a plurality of complex BTs includes metadata matching engine 106 determining a principal BT and/or a complex BT. As an example, the principal BT is based on at least one of a physical data field, a physical data table, a physical file, or a BT that cannot be further decomposed into component BTs. Metadata matching engine 106 determines the complex BT to include the principal BT and at least one other of BTs that may be decomposed.

As shown in FIG. 2, at step 206, process 200 may include generating a logical model based on the plurality of principal terms and the plurality of complex terms, the logical model comprising relations between multiple generations of complex terms arranged in a hierarchical data structure. For example, in some non-limiting embodiments or aspects, complex hierarchical metadata model 108 (e.g., a computing device that stores and/or accesses an associated model) generates a logical model based on the plurality of principal BTs and the plurality of complex BTs.

In some non-limiting embodiments or aspects, metadata matching engine 106 determines that the unique BTs form a multi-dimensional hierarchy as part of the metadata model, such as a three-dimensional (e.g., x, y, z dimensions, etc.) hierarchy. In some examples, metadata matching engine 106 decomposes a complex BT into multiple hierarchies. For example, metadata matching engine 106 decomposes a BT to determine a number of levels deep (e.g., a depth, etc.), a number of levels wide (e.g., a width of the data, etc.), and/or the like. In some cases, metadata matching engine 106 may decompose a BT or model before determining a number of levels (e.g., layers).

In some non-limiting embodiments or aspects, when generating a logical model, metadata matching engine 106 determines or identifies one or more entities with a distinct role for an organizational structure and one or more attributes associated with each entity of the one or more entities, wherein each attribute may define a characteristic portion (e.g., an aspect, part, feature, etc.) of an entity.

In some non-limiting embodiments or aspects, the one or more entities represent many-to-many relationships between an application and a set of tables, one or more fields, or one or more files.

In some non-limiting embodiments or aspects, generating a logical model further comprises generating relationship information (e.g., a link) or a graphical interface associated with each respective relationship. For example, metadata matching engine 106 creates or maintains a hierarchical logical model that encompasses all entities and attributes within a company's data sets and defines them within the BT framework. The BT framework organizes BTs into business-oriented clusters based on various topics such as transactional attributes, merchant data, bank cardholder data, or specific products and services like authentication services. In this example, principal BT includes a fundamental BT that cannot be further subdivided. For example, "Region Code" is a principal BT and may be determined based on a domain of values associated with a particular field. In this example, complex BT provides a BT composed of other BTs.

In some non-limiting embodiments or aspects, metadata matching engine 106 decomposes a second complex BT "Issuer BIN" of the example below, into principal BTs, namely "BIN" and "Issuer." For example:

Business Term: Issuer BIN Owner BID Region Code
(mapped with the physical field: CMLS_IS-SR_BIN_OWN_BID_RGN_CD_DRVD, see Mapping section below)
1. Principal BT: Region Code
2. First Complex BT: Owner Business ID
Principal BT: Owner
Principal BT: Business ID
   Second Complex BT: Issuer BIN
     Principal BT: Issuer
     Principal BT: BIN Each BT, as shown in the example above, may have a separate business definition and a recursive nature, where BTs composed of other BTs include graphical representation of BTs or their associated business definitions maybe found in the provided visual.

Figure 3:
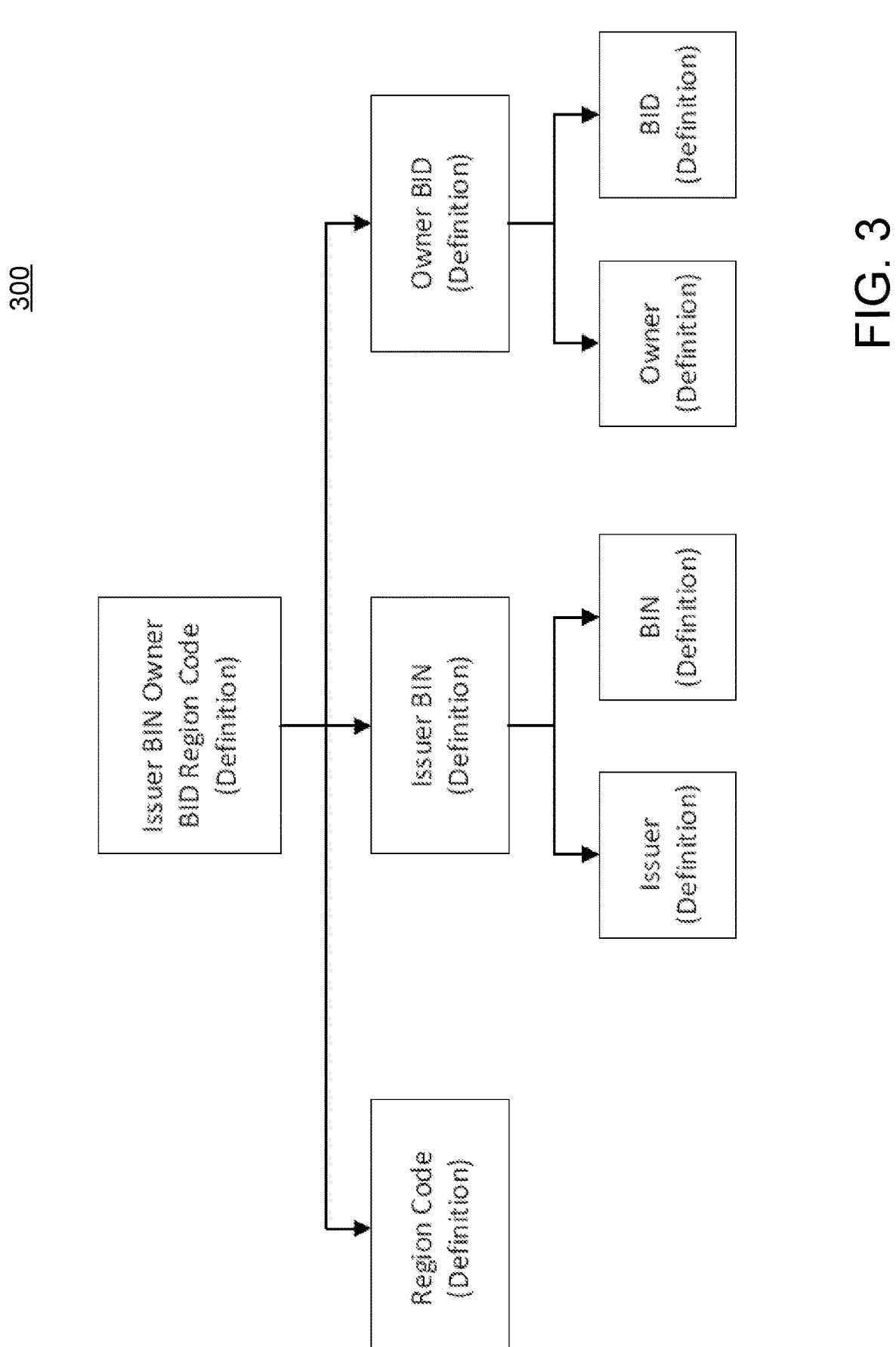
FIG. 3 is a schematic diagram of the natural hierarchies identified within a data source for modeling complex hierarchical metadata according to a non-limiting embodiment.

In addition to the recursive model, with reference to FIG. 2 metadata matching engine 106 incorporates natural hierarchies 300 identified within data sources 102. For example, as shown in FIG. 3, hierarchies 300 include a geography hierarchy that includes levels including Region, Sub Region, Country, State, or Zip, BIN to BID, MCC to MCG (Merchant Category Code to Merchant Category Group). The component of the hierarchy 300 is arranged in a hierarchical order.

In some non-limiting embodiments or aspects, metadata matching engine 106 generates business definitions for complex BTs automatically stitching together one or more metadata components to allow subject matter experts (SMEs) to refine BTs.

The logical modeling step includes steps to capture standardized business definitions for each BT using a predefined template; establish relationships between various BTs, including multiple tiers and many-to-many relationships; integrate the logical model into the governance process; publish a dictionary of BTs filterable by subject area or specific tables/files; provide a graphical interface of BTs and their relationships using a hyperbolic tree metaphor; propagate changes across the knowledge base without significant development efforts; assign dedicated resources and authority to the logical modeling team to ensure the model's ongoing maintenance; extend the metaphor to higher-level data assets, such as tables or files, by providing business definitions for them; include links to valid domains of values where available, such as the ISO Country Code definition table managed by a reference data management system; and capture inter-field relationships that aid in identifying quality issues and support formal data quality programs. In some examples, tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As shown in FIG. 2, at step 208, process 200 may include linking the logical model to a physical component model comprising a plurality of physical data fields by mapping each physical data field of the plurality of physical data fields to at least one of a principal BT and a complex BT in the logical model as metadata. For example, in some non-limiting embodiments or aspects, the logical model is linked to a physical component model comprising a plurality of physical data fields by mapping each physical data field of the plurality of physical data fields to at least one of a principal BT and a complex BT in the logical model as metadata.

In some non-limiting embodiments or aspects, linking the logical model to a physical component model is based on a linked data source for determining at least one data object. For example, the linked data source may comprise a link to metadata of a physical component. The linked physical component may include metadata defining attributes or characteristics of the physical component or entity. Data sources 102 may determine at least a portion of a data definition based on a linked physical component. For example, data sources 102 may generate a new data definition based on at least a portion of an existing data definition for the linked physical component.

In non-limiting embodiments, data sources 102 and/or linked data source 110 generates a data dictionary for a data set based on complex hierarchical metadata model 108. As an example, an output (e.g., graphical interface, display, report, and/or the like) may include any number of transactions per month by region and may be selected from any number of different regions (issuer region, owner region, etc.). In this example, linked data source 110 may be programmed or configured to open definitions (e.g. visually browse to the definition) on up to ten (10) (or another number) different data sources 102. In non-limiting embodiments, the data dictionary may be part of a data analytics tool that is configured to accurately and efficiently store, link, or determine information about fields, tables, or other data objects in use. In some examples, linked data source 110 may be linked to data sources 102 (e.g., a data repository, etc.) that stores an actual definition. In some non-limiting embodiments or aspects, linked data source 110 may refer to different data sources 102 that stores a named component relating to linked data source 110 and in this way avoids assigning definitions which may otherwise require extra fields (e.g., storing extra fields), such as extra fields in a database or in each table of a database.

In some non-limiting embodiments or aspects, each physical field of a data table is linked (e.g., mapped) to a logical model entry associated with a different business term that may be stored in a different data source 102a-102n. In some non-limiting embodiments or aspects, after mapping each field, an interactive graphical user interface (GUI) is generated based on the mapped fields. For example, the interactive GUI may visualize each respective relationship, may facilitate an update of a data definition, and/or inform users about an entity based on information of a particular field.

In some non-limiting embodiments or aspects, metadata system 104 generates one or more views. For example, one or more views integrated into metadata system 104 may be linked to one or more respective base objects, such as a table, a file, a database, other fundamental elements, and/or the like in the data architecture of data sources 102 to ensure efficiency and accurate operation. For example, the base object generates other related objects. Base objects may represent the underlying data structures or components upon which other database objects, such as views, queries, or derived tables are built and provide the essential structure and context for understanding and accessing the data. Metadata associated with base objects includes information about their structure, attributes, relationships, and/or other relevant properties. As an example, metadata system 104 generates one or more views synchronized with the underlying data, and remains synchronized with any changes made to the base object that may be reflected in the associated views. This linkage helps maintain consistency and efficiency in data processing and access to base objects.

In some non-limiting embodiments or aspects, metadata system 104 determines private directories of interest as exceptional cases (e.g., edge case, etc.) in the metadata framework. Metadata system 104 may distinguish between private objects, public objects, shared objects, and/or the like, for better organization and management of metadata assets.

In some non-limiting embodiments or aspects, metadata system 104 provides internal staging tables. For example, metadata system 104 provides tables with a role in the data pipeline that require updates. In some example, internal staging tables should be labeled as private to the application to identify their purpose and significance within the overall system. In some non-limiting embodiments or aspects, metadata system 104 accesses business definitions, operational metadata, and technical metadata from an enterprise metadata catalog. In the above examples, metadata system 104 efficiently incorporates views, thereby distinguishing between different types of objects, marking relevant tables as private, and addressing the integration of metadata between tables and the enterprise catalog.

In some non-limiting embodiments or aspects, metadata system 104 includes the assets within data sources 102, such as a data platform (DP) and also includes other assets and systems linked outside of the DP.

In some non-limiting embodiments or aspects, metadata system 104 may register a reference data management (RDM) to copy jobs in a metadata repository or catalog to subscribe to or replicate RDM tables to their own systems to extend beyond the data platform to include these external systems and assets. Before proceeding with the mapping process, each of the physical structures associated with one or more data assets may be made available to the overall metadata process, such as physical structures, table layouts, DDL scripts, file formats, and/or other relevant information.

In some non-limiting embodiments or aspects, metadata system 104 may scan the structures of all relevant data sets. This involves allowing metadata system 104 to examine and capture necessary information from one or more physical structures. The captured information is then stored correctly within the metadata repository or catalog enabling comprehensive and accurate metadata management.

In some non-limiting embodiments or aspects, metadata system 104 captures structure information for each data set regardless of the platform used (e.g., RDBMS, Hadoop, HBase, SAS, etc.) and may include the instance in which the data set resides (e.g., OPR, OPR2, ANA). In some examples, if the structure is not naturally associated with the file, metadata system 104 obtains the structure information from alternative sources (e.g., a Hive metastore, etc.). In some non-limiting embodiments or aspects, metadata system 104 retains a physical path, including platform, instance, or other attributes that differentiate files. For example, if there are two files (e.g., one on ANA and one on OPR, etc.) distinct structures are obtained for each. In some examples, logical structures describe database objects (e.g., views, aliases, etc.). Ownership information may be captured (e.g., stored, etc.) for these logical structures during the information harvesting process. Metadata system 104 tracks field additions, deletions, and/or changes over time. For example, a timestamp may provide information for the structures. In addition, audit-type reporting may identify data sets in data sources 102 that are not registered within the metadata system. Once identified, these data sets may be added within a service lever.

Metadata system 104 may enforce naming conventions for fields, files, code modules, and/or the like. Metadata system 104 may identify or generate a standard naming convention and review process for fields, files, tables, applications, directories, or other relevant data components.

As shown in FIG. 2, at step 210, process 200 may include automatically generating an interactive data dictionary for the payment processing system based on each physical data field in a database and corresponding attributes for metadata associated with each physical data field. For example, in some non-limiting embodiments or aspects, data sources 102 and/or complex hierarchical metadata model 108 automatically generate or publish an interactive data dictionary for the payment processing system based on each physical data field in a database or corresponding attributes for metadata associated with each physical data field.

In some non-limiting embodiments or aspects, business definitions are generated in a self-reference model to determine data definitions in an existing data source or repository. For example, a business definition may be used to automatically determine where one or more fields of linked data source 110 are stored or used (e.g., data sources 102). In some examples, the linking of a data source to one or more other data sources 102 is performed automatically to determine the definitions of the data. For example, the logical model of the hierarchical metadata model may generate a complete data definition based on the links. The completed data definition resolves all fields to their principal BTs or definitions.

In some non-limiting embodiments or aspects, metadata system 104 identifies or integrates a governance process into the metadata framework. For example, metadata matching engine 106 provides governance that includes evaluating the accuracy of relationships and business definitions for each BT. Metadata matching engine 106 may identify the most appropriate governance processes in an interface. Metadata matching engine 106 may implement the governance framework to provide the full approval process within clearly defined roles and responsibilities for governance participants. In addition, metadata matching engine 106 may implement the governance framework to address submitted requests with service level agreements (SLAs), ensure that the data definitions adhere to the BT template, explicitly identify governance resources (e.g., data steward), and incorporate governance tasks into their respective job descriptions.

Metadata system 104 may include a metadata user interface (UI) and/or API's that are essential components of a data governance system, including for the display and modeling of the captured data accessible by applications through APIs.

Metadata matching engine 106 accesses the metadata store managed by metadata system 104 (e.g., a metadata information steward, etc.). Segregation of access may be implemented based on roles to authorize specific groups to access certain data sets. Metadata system 104 provides the UI for engineers, machine learning modelers, business team, and product team members. Metadata matching engine 106 provides field-level lineage graphically with user interaction. End users may export reports (e.g., to CSV, Excel, etc.) for directing users to the UI for information retrieval. In some examples, a reporting interface provides a library of metadata-based information. For example, metadata system 104 provides logical model data dictionaries, master listings of tables, core data assets, code tables, subject area contacts, and/or the like. In addition, an administrative interface includes applications for defining metadata, link it to metadata code generation, or a combination. In some examples, the UI provides manual field mapping (e.g., addition, modification, deletions, etc.) for applying arrangements of BTs.

Figure 4:
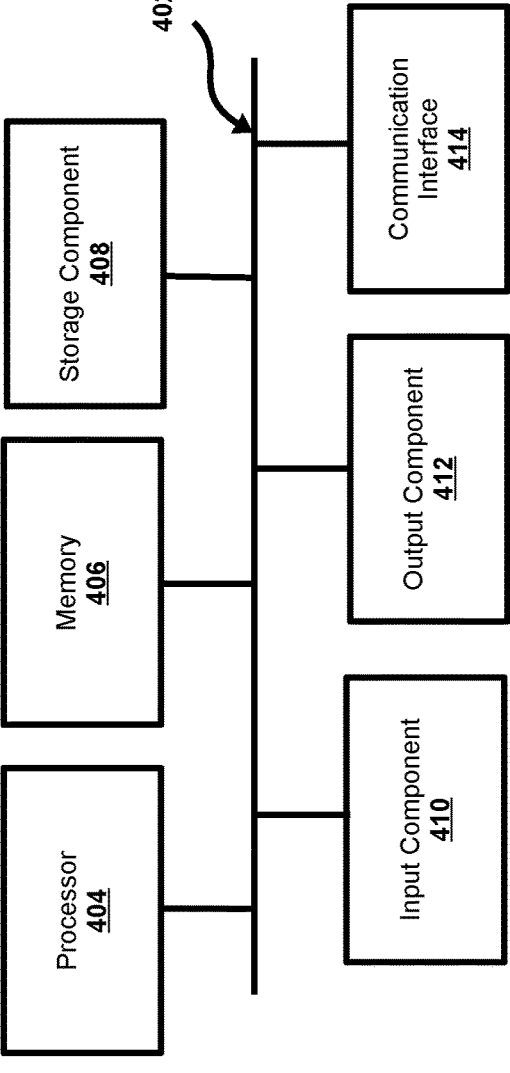
FIG. 4 illustrates example components of a device used in connection with non-limiting embodiments.

Referring now to FIG. 4, shown is a diagram of example components of device 400 according to non-limiting embodiments. Device 400 may correspond to data sources 102a-102n, metadata system 104, metadata matching engine 106, complex hierarchical metadata model 108, linked data source 110, and communication network 112 of FIG. 1, as an example. In some non-limiting embodiments, such systems or devices may include at least one device 400 and/or at least one component of device 400. The number and arrangement of components shown are provided as an example. In some non-limiting embodiments, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

As shown in FIG. 4, device 400 may include bus 402, processor 404, memory 406, storage component 408, input component 410, output component 412, and communication interface 414. Bus 402 may include a component that permits communication among the components of device 400. In some non-limiting embodiments, processor 404 may be implemented in hardware, firmware, or a combination of hardware and software. For example, processor 404 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that may be programmed to perform a function. Memory 406 may include random access memory (RAM), read only memory (ROM), and/or another type of dynamic or static storage device (e.g., flash memory, magnetic memory, optical memory, etc.) that stores information and/or instructions for use by processor 404.

With continued reference to FIG. 4, storage component 408 may store information and/or software related to the operation and use of device 400. For example, storage component 408 may include a hard disk (e.g., a magnetic disk, an optical disk, a magneto-optic disk, a solid state disk, etc.) and/or another type of computer-readable medium. Input component 410 may include a component that permits device 400 to receive information, such as via user input (e.g., a touch screen display, a keyboard, a keypad, a mouse, a button, a switch, a microphone, etc.). Additionally, or alternatively, input component 410 may include a sensor for sensing information (e.g., a global positioning system (GPS) component, an accelerometer, a gyroscope, an actuator, etc.). Output component 412 may include a component that provides output information from device 400 (e.g., a display, a speaker, one or more light-emitting diodes (LEDs), etc.). Communication interface 414 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 414 may permit device 400 to receive information from another device and/or provide information to another device. For example, communication interface 414 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 400 may perform one or more processes described herein. Device 400 may perform these processes based on processor 404 executing software instructions stored by a computer-readable medium, such as memory 406 and/or storage component 408. A computer-readable medium may include any non-transitory memory device. A memory device includes memory space located inside of a single physical storage device or memory space spread across multiple physical storage devices. Software instructions may be read into memory 406 and/or storage component 408 from another computer-readable medium or from another device via communication interface 414. When executed, software instructions stored in memory 406 and/or storage component 408 may cause processor 404 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but on the contrary, is intended to cover modifications and equivalent arrangements that are within the spirit and scope of the appended claims. For example, it is to be understood that the present disclosure contemplates that, to the extent possible, one or more features of any embodiment may be combined with one or more features of any other embodiment.

The invention claimed is:

1. A computer-implemented method comprising:
   determining, by a metadata matching engine executed by at least one processor, a plurality of principal terms, each principal term representing at least one first attribute of a payment processing system, the metadata matching engine generating the principal terms based on metadata associated with physical data fields of the payment processing system, including corresponding business functions of the metadata;
   generating, by the metadata matching engine, a plurality of complex terms, each complex term recursively constructed from at least one of the principal terms and the plurality of complex terms across multiple generations, the principal terms and the plurality of complex terms being arranged as nodes within a hierarchical metadata model comprising multiple generations of complex terms;
   constructing, by at least one processor, a logical model based on the plurality of principal terms and the plurality of complex terms, the logical model comprising relations between multiple generations of complex terms organized within a hierarchical data structure, wherein lineage information maintained across multiple generations of complex terms identities, for each of the plurality of the complex terms, corresponding underlying principal terms and associated metadata mappings;
   converting, by the metadata matching engine, each data source of the payment processing system into a linked data source by registering links to one or more storage devices and data dictionaries associated with the data source, and by maintaining lineage information identifying associations between physical data fields and corresponding principal terms and/or complex terms across multiple repositories, thereby exposing programmatic references usable to resolve data definitions across the repositories;
   mapping, using the linked data source, each physical data field in a physical component model to at least one of the principal terms and/or the plurality of complex terms to link the logical model to the physical component model, the mapping of each physical data field comprising identifiers, types, and metadata associations;
   generating, by at least one processor associated with one or more data sources and the hierarchical metadata model, using the linked data source, an interactive data dictionary for the payment processing system by using lineage information within the linked data source to determine where one or more fields are stored or used and to resolve corresponding data definitions, the interactive data dictionary being generated by mapping the physical data fields to the principal terms and/or the plurality of complex terms; and
   automatically updating, by at least one processor, the interactive data dictionary in response to changes in the logical model or any of the linked data sources, the updating providing lineage information maintained in the linked data source to regenerate mappings between the physical data fields and the principal terms and/or the complex terms of the payment processing system, thereby maintaining synchronization between the hierarchical metadata model and the physical data fields.

2. The computer-implemented method of claim 1, wherein generating the plurality of complex terms comprises:
   determining a principal term based on at least one of the following: a physical data field, a physical data table, a physical file, a business term that cannot be further decomposed into component business terms, or any combination thereof.

3. The computer-implemented method of claim 1, wherein generating the logical model comprises:
   identifying one or more entities with a unique role in a data set, and one or more attributes associated with each entity of the one or more entities, wherein each attribute defines a characteristic feature of an entity, and wherein each entity is represented as a node with a logical role in a directed graph.

4. The computer-implemented method of claim 3, wherein the one or more entities are combined to form many-to-many relationships between an application and a set of tables, one or more fields, or one or more files.

5. The computer-implemented method of claim 1, further comprising:
   displaying a graphical interface comprising a visual representation of linked business concepts and physical data fields based on the logical model.

6. The computer-implemented method of claim 1, wherein linking the logical model to a physical component model comprises:
   determining at least one linked data source for each of the at least one first attribute and at least one second attribute.

7. The computer-implemented method of claim 6, wherein the at least one linked data source comprises a link to metadata, the method comprising:

determining at least a portion of a data definition based on the link to the metadata.

8. A system comprising:

a metadata matching engine, at least one processor; and at least one non-transitory computer readable medium comprising one or more instructions that, when executed by the at least one processor, cause the at least one processor to perform the operations of:

determining a plurality of principal terms, each principal term representing at least one first attribute of a payment processing system, wherein the metadata matching engine generates the principal terms based on metadata associated with physical data fields of the payment processing system including corresponding business functions of the metadata;

generating a plurality of complex terms, each complex term recursively constructed from at least one of the principal terms and the plurality of complex terms across multiple generations, the principal terms and the plurality of complex terms being arranged as nodes within a hierarchical metadata model comprising multiple generations of complex terms;

constructing a logical model based on the plurality of principal terms and the plurality of complex terms, the logical model comprising relations between multiple generations of complex terms inorganized within a hierarchical data structure, wherein lineage information maintained across multiple generations of complex terms identifies for each of the plurality of the complex terms, corresponding underlying principal terms and associated metadata mappings;

converting, by the metadata matching engine, each data source of the payment processing system into a linked data source by registering links to one or more storage devices and data dictionaries associated with the data source, and by maintaining lineage information identifying associations between physical data fields and corresponding principal terms and/or complex terms across multiple repositories, thereby exposing programmatic references usable to resolve data definitions across the repositories;

mapping, using the linked data source, each physical data field in a physical component model to at least one of a principal term and/or the plurality of complex terms to link the logical model to the physical component model, the mapping of each physical data field comprising identifiers, types, and metadata associations;

generating, using the linked data source, an interactive data dictionary for the payment processing system by using lineage information within the linked data source to determine where one or more fields are stored or used and to resolve corresponding data definitions, the interactive data dictionary being generated by mapping the physical data fields to the principal terms and/or the plurality of complex terms; and automatically updating the interactive data dictionary in response to changes in the logical model or any of the linked data sources, the updating providing lineage information maintained in the linked data source to regenerate mappings between the physical data fields and the principal terms and/or the complex terms of the payment processing system, thereby maintaining synchronization between the hierarchical metadata model and the physical data fields.

9. The system of claim 8, wherein the one or more instructions, when executed by the at least one processor, cause the at least one processor to perform the operations of:

determining a principal term based on at least one of the following: a physical data field, a physical data table, a physical file, a business term that cannot be further decomposed into component business terms, or any combination thereof.

10. The system of claim 8, wherein the one or more instructions, when executed by the at least one processor, to perform the operations of:

identifying one or more entities with a unique role, and one or more attributes associated with each entity of the one or more entities, wherein each attribute defines a characteristic feature of an entity, and wherein each entity is represented as a node with a logical role in a directed graph.

11. The system of claim 10, wherein the one or more entities are combined to form many-to-many relationships between an application and a set of tables, one or more fields, or one or more files.

12. The system of claim 8, wherein the one or more instructions, when executed by the at least one processor, cause the at least one processor to perform the operations of:

displaying a graphical interface comprising a visual representation of linked business concepts and physical data fields based on the logical model.

13. The system of claim 8, wherein the one or more instructions, when executed by the at least one processor, cause the at least one processor to perform the operation of linking the logical model to a physical component model by:

determining at least one linked data source for each of the at least one first attribute and at least one second attribute.

14. The system of claim 13, wherein the at least one linked data source comprises a link to metadata, and the one or more instructions, when executed by the at least one processor causes the at least one processor to perform the operation of:

determining at least a portion of a data definition based on the link to the metadata.

15. A computer program product comprising at least one non-transitory computer-readable medium including one or more instructions that, when executed by at least one processor, cause at least one processor to perform the operations of:

determining, a plurality of principal terms, each principal term representing at least one first attribute of a payment processing system, wherein the metadata matching engine generates the principal terms on metadata associated with physical data fields of the payment processing system, including corresponding business functions of the metadata;

generating a plurality of complex terms, each complex term recursively constructed from at least one of the principal terms and the plurality of complex terms across multiple generations, the principal terms and the plurality of complex terms being arranged as nodes within a hierarchical metadata model comprising multiple generations of complex terms;

constructing a logical model based on the plurality of principal terms and the plurality of complex terms, the logical model comprising relations between multiple generations of complex terms organized within a hierarchical data structure, wherein lineage information maintained across multiple generations of complex terms identifies for each of the plurality of the complex terms, corresponding underlying principal terms and associated metadata mappings;

converting, by the metadata matching engine, each data source of the payment processing system into a linked data source by registering links to one or more storage devices and data dictionaries associated with the data source, and by maintaining lineage information identifying associations between physical data fields and corresponding principal terms and/or complex terms across multiple repositories, thereby exposing programmatic references usable to resolve data definitions across the repositories mapping, using the linked data source, each physical data field in a physical component model to at least one of the principal terms and/or the plurality of complex terms to link the logical model to the physical component model, the mapping of each physical data field comprising identifiers, types, and metadata associations;

generating, using the linked data source, an interactive data dictionary for the payment processing system by using lineage information within the linked data source to determine where one or more fields are stored or used and to resolve corresponding data definitions, the interactive data dictionary being generated by mapping the physical data fields to the principal terms and/or the plurality of complex terms; and automatically updating the interactive data dictionary in response to changes in the logical model or any of the linked data sources, the updating providing lineage information maintained in the linked data source to regenerate mappings between the physical data fields and the principal terms and/or the complex terms of the payment processing system, thereby maintaining synchronization between the hierarchical metadata model and the physical data fields.

16. The computer program product of claim 15, wherein the one or more instructions, when executed by the at least one processor, further cause the at least one processor to perform the operation of:

determining a principal term based on at least one of the following: a physical data field, a physical data table, a physical file, a business term that cannot be further decomposed into component business terms, or any combination thereof.

17. The computer program product of claim 15, wherein the one or more instructions, when executed by the at least one processor, further cause the at least one processor to perform the operation of:

identifying one or more entities with a unique role, and one or more attributes associated with each entity of the one or more entities, wherein each attribute defines a characteristic feature of an entity, and wherein each entity is represented as a node with a logical role in a directed graph.

18. The computer program product of claim 17, wherein the one or more instructions, when executed by the at least one processor, cause the at least one processor to perform the operation of combining the one or more entities to form many-to-many relationships between an application and a set of tables, one or more fields, or one or more files.

19. The computer program product of claim 15, wherein the one or more instructions, when executed by the at least one processor, further cause the at least one processor to perform the operation of:

displaying a graphical interface comprising a visual representation of linked business concepts and physical data fields based on the logical model.

20. The computer program product of claim 15, wherein the one or more instructions, when executed by the at least one processor, further cause the at least one processor to perform the operations of:

determining at least one linked data source for each of the at least one first attribute and at least one second attribute; and determining at least a portion of a data definition based on the link to the metadata.

* * * * *